(12) United States Patent
Chen

(10) Patent No.: US 8,057,063 B2
(45) Date of Patent: Nov. 15, 2011

(54) SOLAR-POWERED ILLUMINATION DEVICE

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 62 days.

(21) Appl. No.: 12/770,740

(22) Filed: Apr. 30, 2010

(65) Prior Publication Data

US 2011/0110078 A1 May 12, 2011

(30) Foreign Application Priority Data

Nov. 12, 2009 (CN) .......................... 2009 1 0309645

(51) Int. Cl.
*B60Q 1/00* (2006.01)
(52) U.S. Cl. ........ 362/192; 362/183; 362/234; 362/253; 362/294; 362/373
(58) Field of Classification Search .................. 362/157, 362/183, 192, 218, 234, 253, 294, 373
See application file for complete search history.

(56) References Cited

U.S. PATENT DOCUMENTS

| 7,314,287 | B2 * | 1/2008 | Fan ................................ 362/183 |
| 2004/0196653 | A1 * | 10/2004 | Clark et al. .................... 362/183 |
| 2006/0250803 | A1 * | 11/2006 | Chen ............................. 362/373 |

* cited by examiner

*Primary Examiner* — Stephen F Husar
(74) *Attorney, Agent, or Firm* — Altis Law Group, Inc.

(57) ABSTRACT

A solar-powered illumination device includes a solar-thermal-electric power system transforming solar power into electric energy, an illumination module electrically connecting with the solar-thermal-electric power system, a heat dissipation device dissipating heat generated by the illumination module and a heat-collection box receiving at least a part of the heat dissipation device therein. The solar-thermal-electric power system drives the illumination module to illuminate. The heat dissipated by the at least a part of the heat dissipation device is collected by the heat-collection box and transferred into the solar-thermal-electric power system. The solar-thermal-electric power system transforms the heat dissipated by the at least a part of the heat dissipation device into electric energy.

17 Claims, 1 Drawing Sheet

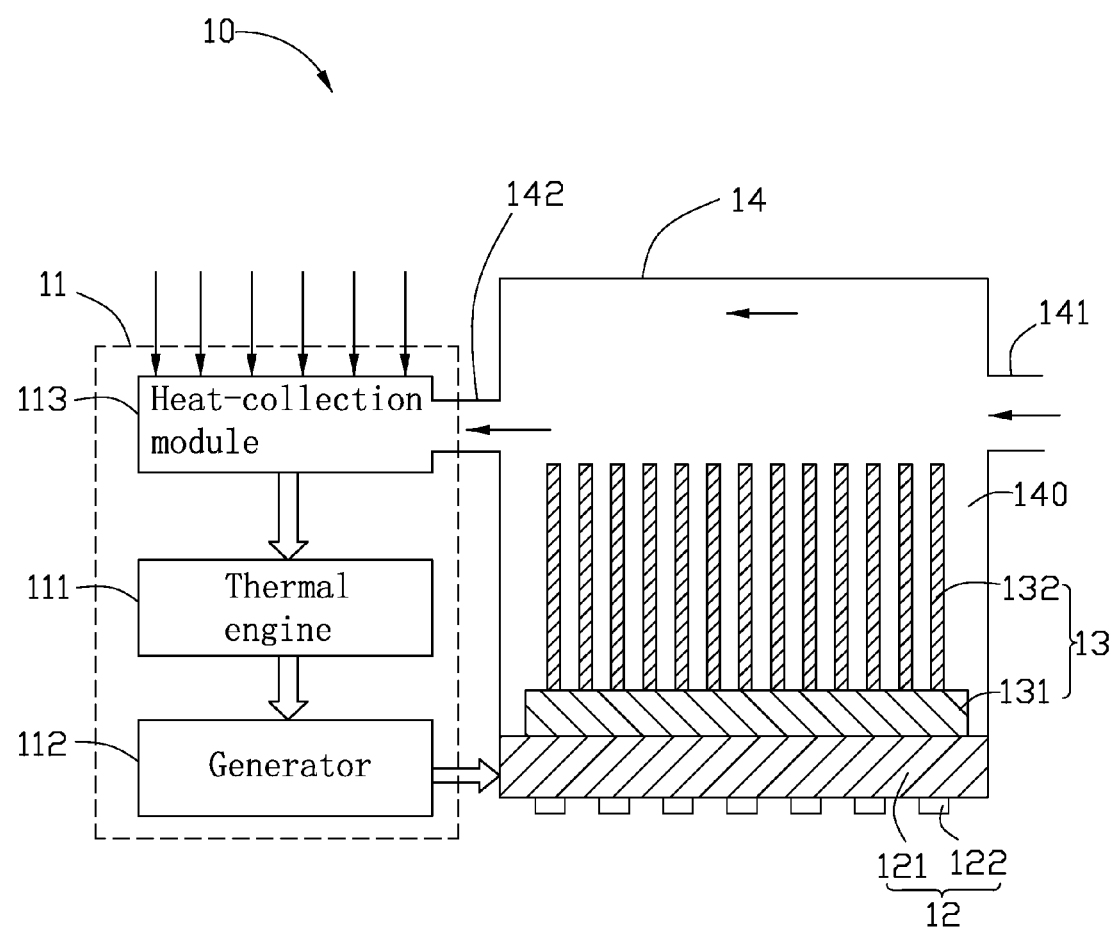

SOLAR-POWERED ILLUMINATION DEVICE

BACKGROUND

1. Technical Field

The disclosure relates to solar-powered illumination devices and, more particularly, to a solar-powered illumination device having a high utilization rate of energy.

2. Description of Related Art

A typical solar-powered illumination device transforms solar power into electric energy by a solar-thermal-electric power system to drive an illumination unit. During the illumination unit work, a part of the electric energy is transformed into light energy for illumination, and the other part of the electric energy is transformed into heat energy. The heat energy is dissipated into environment, resulting in a waste of energy.

What is need, therefore, is a solar-powered illumination device having a high utilization rate of energy.

BRIEF DESCRIPTION OF THE DRAWINGS

Many aspects of the disclosure can be better understood with reference to a following drawing. The components in the drawing are not necessarily drawn to scale, the emphasis instead being placed upon clearly illustrating the principles of the disclosure. Moreover, in the drawing, like reference numerals designate corresponding parts throughout the view.

The only FIGURE is a schematic view of a solar-powered illumination device in accordance with an embodiment of the disclosure.

DETAILED DESCRIPTION

Referring to the only FIGURE, a solar-powered illumination device 10 is illustrated in accordance with an embodiment of the disclosure. The solar-powered illumination device 10 comprises a solar-thermal-electric power system 11 for transforming solar power into electric energy, an illumination module 12, a heat dissipation device 13 for dissipating heat generated by the illumination module 12 and a heat-collection box 14 for collecting the heat dissipated by the heat dissipation device 13.

The solar-thermal-electric power system 11 comprises a thermal engine 111, a generator 112 and a heat-collection module 113. The heat-collection module 113 collects and stores the solar power, and transfers the solar power to the thermal engine 111. The thermal engine 111 drives the generator 112 to generate electricity.

The illumination module 12 comprises a substrate 121 and a plurality of light emitting units 122 attached to a bottom surface of the substrate 121. The generator 112 is connected electrically with the light emitting units 122 for supplying electric energy to the light emitting units 122. The light emitting units 122 may choose LEDs because of theirs long-term reliability, environment friendliness and low power consumption.

The heat dissipation device 13 comprises a base 131 and a plurality of fins 132 extending upwardly from the base 131. The fins 132 are parallel to and spaced from each other. The base 131 is attached to a top surface of the substrate 121 of the illumination module 12. The base 131 and the fins 132 can be made of materials with high conductivity, such as copper, aluminum. In other embodiments, the heat dissipation device 13 may be other heat dissipation structures, such as a heat sink comprising heat pipes or a heat sink with a fan.

The heat-collection box 14 engages with a circumferential edge of the substrate 121 of the illumination module 12 to cooperatively define a heat-collection cavity 140. The heat dissipation device 13 is received in the heat-collection cavity 140. The heat-collection box 14 comprises an entrance 141 and an exit 142 opposite to the entrance 141. Preferably, the entrance 141 and the exit 142 are disposed on two opposite sides of a top portion of the heat-collection box 14. In another embodiment, the entrance 141 can be disposed at a low portion of the heat-collection box 14 to facilitate a sufficient heat exchange of the air and the fins 132 of the heat dissipation device 13. The entrance 141 is communicated with environment, by which the external cooling air enters into the heat-collection box 14. The exit 142 is in communication with the heat-collection module 113. The heat dissipated by the heat dissipation device 13 enters into the heat-collection module 113 via the exit 142 and is collected by the heat-collection module 13. It is understood that the heat-collection cavity 140 receives a part of the heat dissipation device 13; that is, the heat-collection box 14 collects a part of the heat dissipated by the heat dissipation device 13.

The heat-collection module 113 collects and stores the solar power and transforms the solar power to heat energy, then transfers the heat energy to the thermal engine 111. The thermal engine 111 accepts the heat energy to drive the generator 112 to generate electricity, which drives the light emitting units 122 to work. The light emitting units 122 accept the electric energy, wherein a part of the electric energy is transformed into light for illumination, and the other part of the electric energy is transformed into heat. The heat generated by the light emitting units 122 is dissipated in the heat-collection box 40 via the heat dissipation device 13. The external cooling air enters into the heat-collection box 14 via the entrance 141, thereby driving the heated air in the heat-collection box 14 into the heat-collection module 113 via the exit 142. The heat-collection module 113 collects and stores the heat energy from the heat-collection box 14 and the heat energy from the solar power, thus starting another energy cycle in the solar-powered illumination device 10.

The heat-collection module 113 collects and stores the heat generated by the light emitting units 122 to drive the generator 112 via the thermal engine 111, thereby improving power generation efficiency of the generator 112 and achieving a heat energy circulation in the solar-powered illumination device 10, further improving the utilization rate of energy. Due to the entrance of the external cooling air, the heat dissipated by the heat dissipation device 13 is pushed into the heat-collection module 113 so that the external cooling air cools down the heat dissipation device 13.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A solar-powered illumination device comprising:
   a solar-thermal-electric power system transforming solar power into electric energy;
   an illumination module electrically connecting with the solar-thermal-electric power system, the solar-thermal-electric power system driving the illumination module to illuminate;

a heat dissipation device dissipating heat generated by the illumination module; and a heat-collection box receiving at least a part of the heat dissipation device therein, the heat dissipated by the at least a part of the heat dissipation device being collected by the heat-collection box and transferred into the solar-thermal-electric power system, and the solar-thermal-electric power system transforming the heat dissipated by the at least a part of the heat dissipation device into electric energy.

2. The solar-powered illumination device of claim 1, wherein the solar-thermal-electric power system comprises a thermal engine, a generator and a heat-collection module, the heat-collection module collecting solar power and transforming the solar power into heat energy and transferring the heat energy to the thermal engine, the thermal engine accepting the heat energy to drive the generator.

3. The solar-powered illumination device of claim 2, wherein the illumination module comprises a substrate and a plurality of light emitting units attached to a bottom surface of the substrate, the generator electrically connecting with the light emitting units, thereby driving the light emitting units to illuminate.

4. The solar-powered illumination device of claim 3, wherein each of the light emitting units is an LED.

5. The solar-powered illumination device of claim 3, wherein the light emitting units are disposed outside of the heat-collection box.

6. The solar-powered illumination device of claim 5, wherein the heat dissipation device comprises a base attached to a top surface of the substrate of the illumination module, absorbing heat generated by the light emitting units.

7. The solar-powered illumination device of claim 6, wherein the heat dissipation device further comprises a plurality of fins extending upwards from the base.

8. The solar-powered illumination device of claim 7, wherein the fins are parallel to and spaced from each other.

9. The solar-powered illumination device of claim 5, wherein the heat-collection box and the substrate of the illumination module cooperatively define a heat-collection cavity, the heat-collection cavity receiving the heat dissipation device entirely therein.

10. The solar-powered illumination device of claim 9, wherein the heat-collection box comprises an entrance and an exit opposite to the entrance, cooling air entering into the heat-collection cavity via the entrance, heated air entering into the heat-collection module via the exit, the heat-collection module collecting heat energy and transferring the heat energy to the thermal engine.

11. The solar-powered illumination device of claim 10, wherein the entrance and the exit are disposed at a top portion of the heat-collection box.

12. A solar-powered illumination device comprising:
an illumination module;
a heat dissipation device dissipating heat generated by the illumination module;
a heat-collection box receiving at least a part of the heat dissipation device therein, the heat dissipated by the at least a part of the heat dissipation device being collected by the heat-collection box; and
a solar-thermal-electric power system comprising a heat-collection module, a thermal engine and a generator, the heat-collection module transforming solar power into heat energy and accepting the heat collected by the heat-collection box, the thermal engine accepting the heat energy transformed from solar power and heat from the heat-collection box to drive the generator to generate electric energy to drive the illumination module to illuminate.

13. The solar-powered illumination device of claim 12, wherein the illumination module comprises a substrate and a plurality of light emitting units attached to a bottom surface of the substrate, and the generator drives the light emitting units to illuminate.

14. The solar-powered illumination device of claim 13, wherein the light emitting units are disposed outside of the heat-collection box.

15. The solar-powered illumination device of claim 14, wherein the heat-collection box and the substrate of the illumination module cooperatively define a heat-collection cavity, the heat-collection cavity receiving the whole heat dissipation device.

16. The solar-powered illumination device of claim 15, wherein the heat-collection box comprises an entrance and an exit opposite to the entrance, cooling air entering into the heat-collection cavity via the entrance, heated air entering into the heat-collection module via the exit, the heat-collection module collecting heat energy and transferring the heat energy to the thermal engine.

17. The solar-powered illumination device of claim 16, wherein the entrance and the exit are disposed at a top portion of the heat-collection box.

* * * * *